United States Patent
Wang et al.

(10) Patent No.: US 10,116,564 B2
(45) Date of Patent: *Oct. 30, 2018

(54) HYBRID WILDCARD MATCH TABLE

(71) Applicant: CAVIUM, INC., San Jose, CA (US)

(72) Inventors: Weihuang Wang, Los Gatos, CA (US);
Tsahi Daniel, Palo Alto, CA (US);
Srinath Atluri, Fremont, CA (US)

(73) Assignee: Cavium, Inc., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/536,937

(22) Filed: Nov. 10, 2014

(65) Prior Publication Data
US 2016/0134536 A1    May 12, 2016

(51) Int. Cl.
*H04L 12/743* (2013.01)

(52) U.S. Cl.
CPC ...... *H04L 45/7453* (2013.01); *H04L 45/7457* (2013.01)

(58) Field of Classification Search
CPC . H04L 45/7453; H04L 45/7457; H04L 12/56;
H04L 45/50; H04L 47/10; H04L 47/2441;
H04L 47/31; H04L 47/20; H04L 63/101;
G06F 17/30; G06F 17/30982; G06F 7/06;
G06F 17/30985; G06F 13/362; G06F
13/1605; G06F 13/3625; G06F 13/1689;
Y10S 707/99943; Y10S 707/99948; Y10S
707/99933; Y10S 707/99945; Y10S
707/99932; G06N 5/02
See application file for complete search history.

(56) References Cited

U.S. PATENT DOCUMENTS

| | | | | |
|---|---|---|---|---|
| 6,226,710 B1* | 5/2001 | Melchior | .......... | G06F 17/30982 707/999.003 |
| 7,554,980 B1* | 6/2009 | Yeh | .......... | H04L 45/00 370/392 |
| 7,796,627 B2 | 9/2010 | Hurley et al. | | |
| 7,805,393 B1* | 9/2010 | Venkatachary | .......... | G06N 5/02 706/48 |
| 2003/0191740 A1 | 10/2003 | Stark | | |
| 2005/0174272 A1* | 8/2005 | Cadambi | .......... | G06F 17/30949 341/106 |
| 2006/0116989 A1 | 6/2006 | Bellamkonda et al. | | |
| 2009/0012958 A1* | 1/2009 | Raj | .......... | G06F 17/30985 |
| 2009/0199266 A1* | 8/2009 | Kling | .......... | H04L 63/0263 726/1 |
| 2010/0287160 A1 | 11/2010 | Pendar | | |
| 2012/0323972 A1 | 12/2012 | Ostrovsky | | |
| 2013/0034100 A1* | 2/2013 | Goyal | .......... | G06N 5/02 370/392 |
| 2014/0040518 A1* | 2/2014 | Udipi | .......... | G06F 13/1605 710/117 |
| 2014/0269718 A1* | 9/2014 | Goyal | .......... | H04L 45/74 370/392 |

(Continued)

*Primary Examiner* — Candal Elpenord
*Assistant Examiner* — Hardikkumar D Patel
(74) *Attorney, Agent, or Firm* — Haverstock & Owens LLP

(57) ABSTRACT

Embodiments of the present invention are directed to a wildcard matching solution that uses a combination of static random access memories (SRAMs) and ternary content addressable memories (TCAMs) in a hybrid solution. In particular, the wildcard matching solution uses a plurality of SRAM pools for lookup and a spillover TCAM pool for unresolved hash conflicts.

40 Claims, 6 Drawing Sheets

(56) References Cited

U.S. PATENT DOCUMENTS

| | | | |
|---|---|---|---|
| 2014/0321467 A1* | 10/2014 | Wang | H04L 45/745 370/392 |
| 2015/0039823 A1* | 2/2015 | Chen | G06F 17/30982 711/108 |
| 2015/0333929 A1 | 11/2015 | Le | |
| 2016/0020992 A1* | 1/2016 | Wu | G06F 15/167 709/212 |
| 2016/0028631 A1 | 1/2016 | Yishay | |

* cited by examiner

HYBRID WILDCARD MATCH TABLE

FIELD OF INVENTION

The present invention relates to wildcard matching. More particularly, the present invention relates to a hybrid wildcard match table.

BACKGROUND OF THE INVENTION

A network device classifies packets into different flows using wildcard matching. Ternary content addressable memory (TCAM) is traditionally used to perform wildcard matching because of its speed and simplicity. However, high cost and high power consumption are major drawbacks of TCAM-based wildcard matching engines.

BRIEF SUMMARY OF THE INVENTION

Embodiments of the present invention are directed to a wildcard matching solution that uses a combination of static random access memories (SRAMs) and ternary content addressable memories (TCAMs) in a hybrid solution. In particular, the wildcard matching solution uses a plurality of SRAM pools for lookup and a spillover TCAM pool for unresolved hash conflicts.

In one aspect, a network switch is provided. The network switch includes a plurality of SRAM pools storing hashable entries, at least one spillover TCAM pool storing unhashable entries, and a request interface control logic dispatching a search key to one or more active pools and returning results data.

In some embodiments, each of the plurality of SRAM pools includes 16 SRAM tiles for parallel hashing, and the at least one spillover TCAM pool includes a plurality of TCAM databases as a basic matching unit.

In some embodiments, the network switch also includes a hybrid wildcard match (WCM) table that is accessible by the plurality of SRAM pools, the at least one spillover TCAM pool, and the request interface control logic. In some embodiments, the hybrid WCM includes configurations for the plurality of SRAM pools, the at least one spillover TCAM pool, and the request interface control logic. In some embodiments, the configurations includes configurations for each of the plurality of the SRAM pools, configurations for each of the at least one spillover TCAM and configurations for the request interface control logic. In some embodiments, the configurations identify which of the plurality of SRAM pools and the at least one spillover TCAM pool are the one or more active pools.

In some embodiments, arbitration takes place to determine which of the one or more active pools has priority to return the results data.

In some embodiments, the at least one spillover TCAM pool is organized into eight databases, and each of the eight databases includes six TCAM tiles and is accompanied with a dedicated SRAM for control data return. In some embodiments, each of the six TCAM tiles is 64-bits wide and 512-entries deep.

In some embodiments, each of the plurality of SRAM pools includes eight pairs of SRAM tiles, wherein two of the eight pairs of SRAM tiles store control data and six of the eight pairs of SRAM tiles store entries. In some embodiments, each of the 16 SRAM tiles is 256-bits wide and 2048-lines deep.

In another aspect, a method of implementing a network switch that includes a plurality of SRAM pools and at least one spillover TCAM pool is provided. The method includes receiving an entry to be inserted into one of the pools, determining whether or not the entry is hashable, based on the determination that the entry is hashable, inserting the entry into one of the plurality of SRAM pools, and based on the determination that the entry is not hashable, inserting the entry into the spillover TCAM pool.

In some embodiments, determining whether or not the entry is hashable includes comparing each key_map with the entry. In some embodiments, each of the plurality of SRAM pools includes 16 SRAM tiles, and wherein each of the 16 SRAM tiles is associated with a key_map. In some embodiments, each key_map masks bits of the entry that participate in hashing. In some embodiments, the entry is hashable when all bits in the entry that participate in hashing are not wildcards.

In some embodiments, the entry is inserted into one of two SRAM tiles of the one of the plurality of SRAM pools.

In some embodiments, inserting the entry into one of the plurality of SRAM pools includes rehashing to resolve a hash conflict. In some embodiments, rehashing implements a depth-first insertion algorithm. Alternatively, rehashing implements a breadth-first insertion algorithm.

In some embodiments, the entry is inserted as a pattern into one of the pools.

In yet another aspect, a method of implementing a network switch that includes a plurality of SRAM pools and at least one spillover TCAM pool is provided. The method includes receiving a search key at a request interface control logic, based on a hybrid wildcard match (WCM) table, dispatching the search key to one or more active pools, when the one or more active pools include the spillover TCAM pool, the TCAM pool returning a first set of results that includes data and priority information, when the one or more active pools include at least one of the plurality of SRAM pools, returning a second set of results by each active SRAM pool, wherein the second set of results includes data and priority information, performing a second level arbitration of all sets of results returned by the one or more active pools based on priority, and based on the second level arbitration, outputting data from the set with the highest priority.

In some embodiments, configurations of the hybrid WCM table indicate which of the pools are the one or more active pools.

In some embodiments, lookups in the one or more active pools are performed simultaneously.

In some embodiments, the method also includes, for each active SRAM pool, performing a first level arbitration all sets of results returned by each SRAM tile of a corresponding active SRAM pool based on priority to determine the second set of results.

In some embodiments, the at least one spillover TCAM pool is organized into eight databases, wherein each of the eight databases includes six TCAM tiles and is accompanied with a dedicated SRAM for control data return.

In some embodiments, each of the plurality of SRAM pools includes eight pairs of SRAM tiles, wherein two of the eight pairs of SRAM tiles store control data and six of the eight pairs of SRAM tiles store entries.

In yet another aspect, a memory structure for use with a network switch is provided. The memory structure includes a plurality of SRAM pools storing hashable entries, and at least one spillover TCAM pool storing unhashable entries. The memory structure typically interfaces with a request interface control logic configured to receive a search key of a packet arriving at the network switch and to output results data.

In some embodiments, the request interface control logic dispatches the search key to one or more active pools based on configurations of a hybrid wildcard match (WCM) table accessible by the request interface control logic. The configurations identify which of the plurality of the SRAM pools and the at least one spillover TCAM pool are the one or more active pools. In some embodiments, final arbitration takes place to determine which of the one or more active pools has priority to return the results data.

In some embodiments, each of the plurality of SRAM pools includes multiple SRAM tiles that are logically organized to represent a different logic table width. In some embodiments, the multiple SRAM tiles includes 16 SRAM tiles that are organized in pairs, wherein two of the eight pairs of SRAM tiles store control data and six of the eight pairs of SRAM tiles store entries. In some embodiments, each of the plurality of SRAM pools is configured to perform initial arbitration of all sets of results returned by each SRAM tile of a corresponding SRAM pool and to return a first data based on the initial arbitration and priority information for the first data. In some embodiments, each of the SRAM tiles is associated with a key_map. In some embodiments, an entry is hashable when all bits in the entry that participate in hashing are not wildcards. The key_map determines which bits in the entry participate in the hashing.

In some embodiments, the at least one spillover TCAM pool is organized into a plurality of databases. Each of the plurality databases includes a plurality TCAM tiles and is accompanied with a dedicated SRAM. The at least one spillover TCAM pool is configured to return a second data and priority information for the second data. In some embodiments, the plurality of databases includes eight databases, and the plurality of TCAM tiles includes six TCAM tiles. In some embodiments, the multiple TCAM tiles are logically organized to correspond with a different key size.

In some embodiments, the search key is a combination of one or more header fields of the packet.

In some embodiments, the at least one spillover TCAM also stores entries that cannot be inserted into the plurality of SRAM pools due to hash conflicts.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Figures 1, 2:
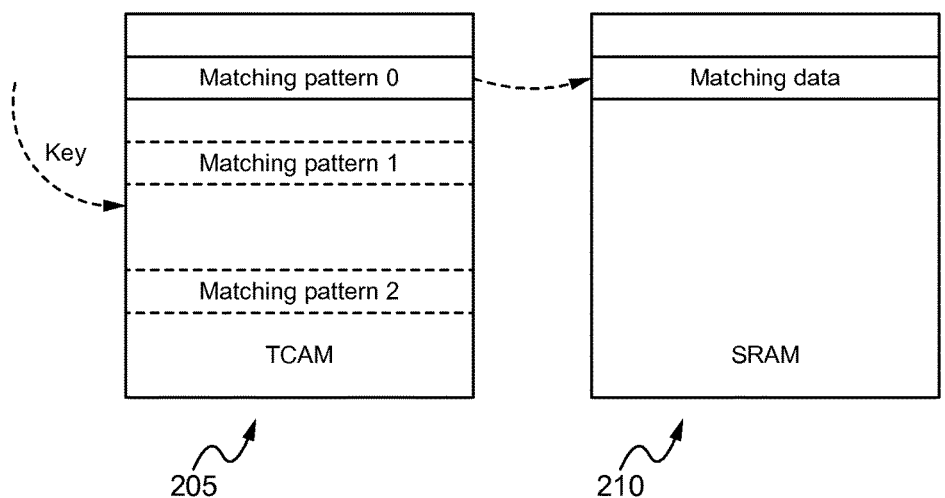
FIG. 1 illustrates an exemplary 5-dimensional packet matching rule.
FIG. 2 illustrates a TCAM-based solution.

FIG. 1 illustrates an exemplary 5-dimensional packet matching rule 100. The five dimensions refer to the five header fields: a source IP field (labeled as src.IP), a destination IP field (labeled as dest.IP), a source port field (labeled as src.port), a destination port field (labeled as dest.port), and a protocol field. The rule 100 includes a match key that is a combination of values, one for each header field. The rule 100 also includes control data that indicates a corresponding action to take when an incoming packet matches the match key.

Each field in the rule is allowed different types of matches, including exact match, prefix match and range match. The use of wildcard (*) in a field with preceding values represents a prefix match, while the standalone use of wildcard in a field indicates that any arbitrary value can match. In FIG. 1, the source IP field and the destination IP field both include values that are prefix specifications, the source port field includes a value that is a wildcard specification, the destination port field includes a value that is a range specification, and the protocol field includes a value that is an exact match specification. The corresponding action associated with the match key of the rule 100 is drop, meaning that if a packet arriving at a network device, such as a network switch, matches the specifications or the match key of the rule 100, then the packet will be dropped by the network switch. Although the control data of the rule 100 includes a single action, the control data of a rule can include a plurality of actions.

As explained above, prior art network devices implement solutions that are based predominantly on ternary content addressable memory (TCAM). In these traditional solutions, as illustrated in FIG. 2, a key is indexed into TCAM 205, which performs parallel matching of all entries in the TCAM 205 and returns an address. The returned address is then indexed into an accompanying SRAM 210, which provides final data such as control data (e.g., drop).

The TCAM 205 has a built-in priority encoding scheme, meaning that the first matched entry is the final matched entry and is indexed into the SRAM 210. In other words, if multiple entries in the TCAM 205 match the key, then the TCAM 205 returns the address of the first matched entry in the TCAM 205. As such, priority is inherent based on the ordering of the entries in the TCAM 205. In FIG. 2, the key matches three entries in the TCAM 205. The address of the first matched entry (labeled as "Matching pattern 0") is returned and indexed into the SRAM 210, which returns the control data (labeled as "Matching data"). Although TCAM-based solutions are relatively fast to implement, these solutions have high cost and power consumption. In addition, these solutions are inefficient in handling range specifications and inserting new entries.

Embodiments of the present invention are directed to a wildcard matching solution that uses a combination of static random access memories (SRAMs) and ternary content addressable memories (TCAMs) in a hybrid solution. In particular, the wildcard matching solution uses a plurality of SRAM pools for lookup and a spillover TCAM pool for unresolved hash conflicts.

The wildcard matching solution is based on an observation made by the inventors regarding prefix specifications and range specifications. The observation, referring to FIG. 1, is that the most significant bits of each dimension are very likely to be an exact match and, hence, are hashable. In some embodiments, the plurality of SRAM pools is configured to store entries that are hashable and the spillover TCAM pool is configured to store entries that are not hashable as well as entries that cannot be inserted into the plurality of SRAM pools due to hash conflicts. Hashability of entries are further discussed below.

Figure 3:
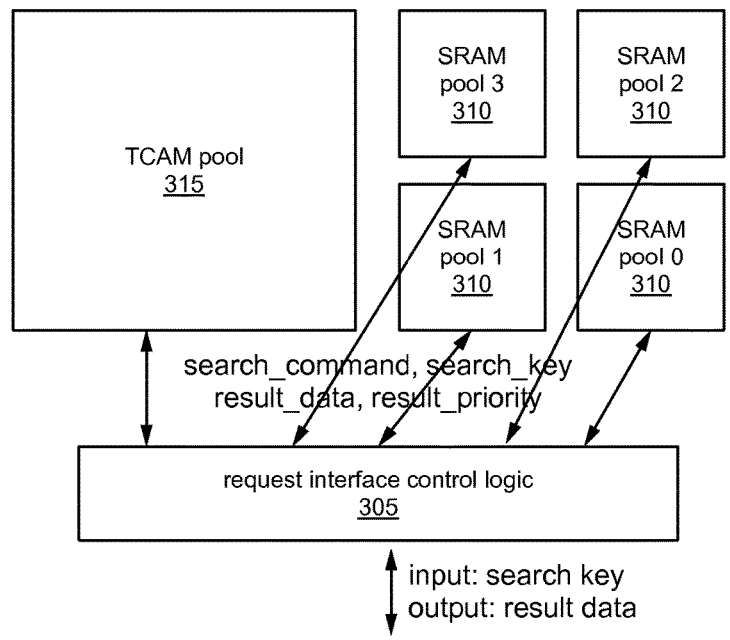
FIG. 3 illustrates an exemplary implementation of a wildcard matching solution in accordance with some embodiments.

FIG. 3 illustrates an exemplary implementation 300 of the wildcard matching solution in accordance with some embodiments. The implementation 300 includes a request interface control logic 305, a plurality of SRAM pools 310 and at least one spillover TCAM pool 315. In some embodiments, each SRAM pool 310 includes 16 SRAM tiles for parallel hashing, and the TCAM pool 315 includes a plurality of TCAM databases as a basic matching unit. Details of the SRAM pool 310 and the TCAM pool 315 are discussed below. Although FIG. 3 shows a single spillover TCAM pool, a plurality of spillover TCAM pools is contemplated. The implementation 300 of the wildcard matching solution is typically carried out on a network device, such as a network switch.

First, at a high level, a search request (e.g., search key) is received at the request interface control logic 305. Upon receiving the request, the control logic 305 dispatches the request data to one or more of the pools that are active, where local matching takes place. After each of the active pools performs local matching, the next level arbitration takes place to determine which of the active pools has the priority to return the final data (e.g., control data). The request interface control logic 305 or another logic in the network device performs the arbitration.

Table 1 lists exemplary configurations of a hybrid wildcard match (WMC) table. The hybrid WMC table resides in any of one or a combination of one or more of the SRAM pools 310 and the spillover TCAM pool 315. Alternatively or in addition to, the hybrid WMC table resides in another part of memory of the network device.

TABLE 1

| Field | Width | Description |
| --- | --- | --- |
| Per Request Interface | | |
| tcam_pool_valid | 1 | Use spillover TCAM pool |
| sram_pool_bitmap | 4 | SRAM pools used |
| key_size | 4 | 128/192/384-bit key |
| data_size | 4 | In unit of byte |
| Per TCAM Pool | | |
| tcam_db_start | 3 | TCAM DB usage within this |
| tcam_db_end | 3 | pool |
| key_size | 4 | 128/192/384-bit key |
| data_size | 4 | In unit of byte |
| Per SRAM Pool | | |
| key_size | 2 | 128/192/384-bit key |
| key_tile_start | 4 | key_tile_start ≤ key_tile_end |
| key_tile_end | 4 | |
| entry_encode_mode | 16 | Pattern encoding mode, one bit per tile |

TABLE 1-continued

| Field | Width | Description |
| --- | --- | --- |
| key_map_way_{0 ... 11} | 32 × 12 | Mask for bits that participates in hashing, 4/6/12-bit granularity for 128/192/384-bit key, respectively |
| data_size | 4 | In unit of byte |
| data_tile_start | 4 | data_tile_start ≤ |
| data_tile_end | 4 | data_tile_end ≤ 15 |

The hybrid WCM table is accessed by the request interface control logic 305, the SRAM pools 310 and the spillover TCAM pool 315 of FIG. 3 and provides each of the units 305-315 corresponding configurations or specifications. For example, the hybrid WCM table includes configurations for the request interface control logic 305 regarding whether to access the spillover TCAM pool, which of the SRAM pools to access, what the size of the key being compared is and what the size of the action being returned is. The hybrid WCM table also includes configurations for each spillover TCAM pool and for each SRAM pool. In some embodiments, the hybrid WCM table is automatically updated, manually updated via software, or both.

Figure 4:
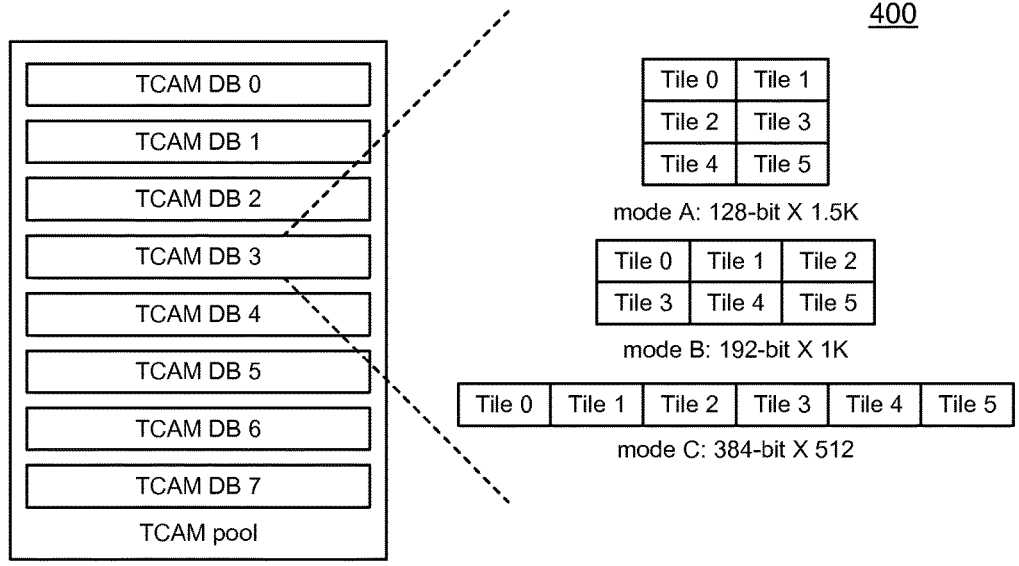
FIG. 4 illustrates an exemplary diagram of a TCAM pool in accordance with some embodiments.

FIG. 4 illustrates an exemplary diagram of a TCAM pool 400 in accordance with some embodiments. In some embodiments, the TCAM pool 315 of FIG. 3 is similarly configured as the TCAM pool 400. The TCAM pool 400 is organized into eight different databases. A database has six TCAM tiles, which are configurable into one of three different modes with different key sizes. In some embodiments, a TCAM tile is 64-bits wide and 512-entries deep, although other sizes are possible. However, based on this size, in one mode (mode A), the six TCAM tiles can be arranged as 128-bits wide by 1.5 k entries deep. In another mode (mode B), the six TCAM tiles can be arranged as 192-bits wide by 1 k entries deep. In yet another mode (mode C), the size TCAM tiles can be arranged as 384-bits wide by 512 entries deep. For each database, there is an accompanying dedicated SRAM for data return. The dedicated SRAM can be a part of the SRAM pools or separate from the SRAM pools. In some embodiments, a single dedicated SRAM is used for all eight databases.

Figure 5:
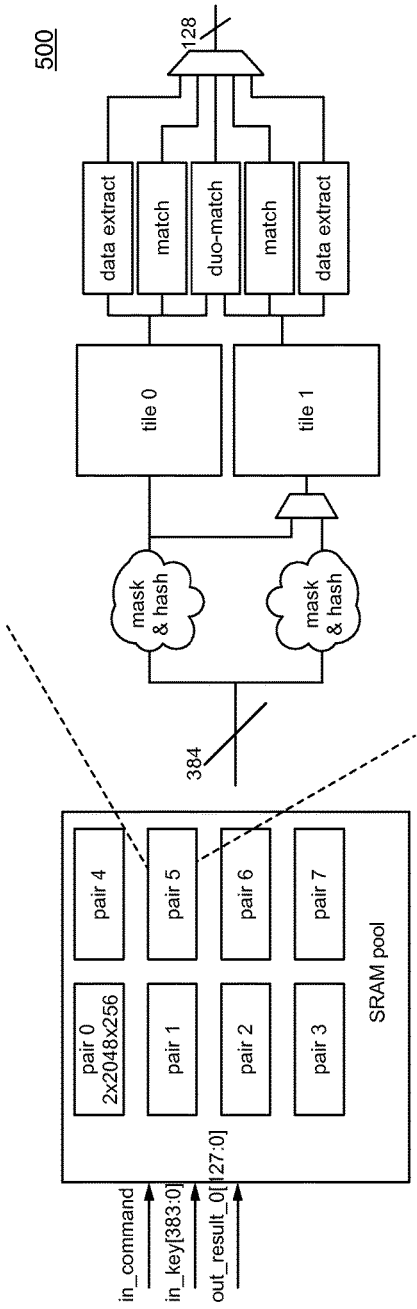
FIG. 5 illustrates an exemplary diagram of a SRAM pool in accordance with some embodiments.

FIG. 5 illustrates an exemplary diagram of a SRAM pool 500 in accordance with some embodiments. In some embodiments, each of the SRAM pools 310 of FIG. 3 is similarly configured as the SRAM pool 500. The SRAM pool 500 includes multiple SRAM tiles. For example, the SRAM pool 500 includes 16 SRAM tiles. These multiple physical memory tiles can be logically organized to represent a different logic table width. In some embodiments, two physical memory tiles are grouped to store one set of logic data. As such, the SRAM pool 500 includes eight pairs of SRAM tiles. The mechanism for the pairing will become more evident as entry insertions and table lookups are discussed. In some embodiments, the logical organization of these multiple SRAM tiles is reconfigurable. In some embodiments, every SRAM tile is 256-bits wide and 2048-lines deep, although other sizes are possible.

Data in the SRAM are stored as separate logical entries in the SRAM. Entries could be of different width based on application. In some embodiments, a logical entry could be 256-bits wide, where every row of a SRAM tile is an entry. A logical entry could also be 512-bits wide, in which case, one row of a SRAM tile (256-bits wide) is concatenated with a row of the other SRAM tile (256-bits wide) in the corresponding pair to be 512-bits wide. As further discussed below, each entry in a SRAM tile stores a pattern.

Assume the SRAM pool 500 is an active pool, which would be indicated as such by the sram_pool_bitmap field in the hybrid WCM table. Once a key arrives at each of the pairs of tiles in the SRAM pool 500, a corresponding hash function is applied to the key. The hash function maps the key to a narrower index or address, which is used to address the SRAM tiles to retrieve an entry. In some embodiments, if a table entry (pattern) is 256-bits wide, then the entire entry is stored in one SRAM line (e.g., each tile is one way). In some embodiments, if a table entry is 512-bits wide, then the entire entry spans across the two SRAM tiles (e.g., every two tiles consist of one way). This is regardless of the input key width. As such, when a search key is forwarded to the SRAM pool 500, each way applies a hash mask and hash function to the search key to look up the entry.

In some embodiments, the SRAM pool 500 can do a maximum 16-way hash for narrow entries. In some embodiments, for hardware cost purposes, control data is stored in two pairs of SRAM tiles and entries are stored in six pairs of SRAM tiles. As such, in these embodiments, the SRAM pool 500 is limited to a 12-way hash for a key of 256-bits or less and to a 6-way hash for a key of 512-bits or less.

Table 2 lists exemplary entry formats of the SRAM entry table. The SRAM entry table shows support for three different key sizes or formats: 128-bit key, 192-bit key and 384-bit key. The 128-bit key can fit in one of two types of 256-bit entries. The 192-bit key fits in a 512-bit. The 384-bit key entry fits in a 512-bit entry.

requires explicit priority to be arbitrated with potential SRAM entry matches. Priority must be specified in the SRAM entry table since priority is decoupled from the addressing itself. The pattern of the entry is encoded. The SRAM entry table also provides a range specification and whether concatenation is set for each entry. The SRAM entry table provides that, for some formats, a mask that indicates which byte(s) or bit(s) of the value field is a "don't care" or wildcard. In some embodiments, the SRAM entry table is either automatically updated or manually updated via software.

To represent a N-bit pattern with wildcards as a binary value requires N×log$_2$3 or 1.6 N bits. For example, a 5-bit pattern with wildcards is an 8-bit binary. Three coefficient values are used to represent a 0 value, a 1 value and a wildcard. In particular, the coefficient value of 0 indicates a 0 value, the coefficient value of 1 indicates a 1 value, and the coefficient value of 2 indicates a wildcard. For example, the encoded 5-bit pattern 5'b01XXX, with X being the wildcard, is an 8-bit binary value of 8'd53, which is equivalent to 8'h35. Specifically, the 8-bit binary value is the total of $2\times3^0$ (for the $0^{th}$ bit in the 5-bit pattern), $2\times3^1$ (for the $1^{st}$ bit in the 5-bit pattern), $2\times3^2$ (for the $2^{nd}$ bit in the 5-bit pattern), $1\times3^3$ (for the $3^{rd}$ bit in the 5-bit pattern), and $0\times3^4$ (for the $4^{th}$ bit in the 5-bit pattern).

The decoded 8-bit binary value 8'd53 is a 5-bit pattern of 5'b01XXX. Specifically, the coefficient values for the bits of

TABLE 2

|  | Width | Field | Description |
| --- | --- | --- | --- |
| 128-bit key (256-bit entry) | 12 | priority | In case of multiple matches, select final match based on priority |
|  | 205 | pattern | Encoded pattern, 0, 1 or X (don't care) |
|  | 6 | dbyte_sel_{0, 1} | Select up to two 16-bit field as range |
|  | 32 | dbyte_up_bound_{0, 1} | specification. Value represented in the pattern field is used as lower bound. |
|  | 1 | dbyte_range_concat | If set, combine both 16-bit fields for one 32-bit comparison |
| 128-bit key (256-bit key) | 20 | priority | In case of multiple matches, select final match based on priority |
|  | 128 | value |  |
|  | 16 | byte_mask | If a bit is 0, a corresponding byte of the value field is "don't care" |
|  | 12 | dbyte_sel_{0 . . . 3} | Select up to four 16-bit fields as range |
|  | 64 | dbyte_up_bound_{0 . . . 3} | specification |
|  | 3 | dbyte_range_concat | If bit i is set, combine field i and i + 1 for 32-bit comparison |
|  | 13 | reserved |  |
| 192-bit key (512-bit entry) | 19 | priority | In case of multiple matches, select final match based on priority |
|  | 192 | value |  |
|  | 192 | bit_mask | If a bit is 0, a corresponding bit of the value field is "don't care" |
|  | 25 | dbyte_sel_{0 . . . 4} | Select up to five 16-bit fields as range |
|  | 80 | dbyte_up_bound_{0 . . . 4} | specification |
|  | 4 | dbyte_range_concat | If bit i is set, combine field i and i + 1 for 32-bit comparison |
| 384-bit key (512-bit entry) | 15 | priority | In case of multiple matches, select final match based on priority |
|  | 384 | value |  |
|  | 48 | byte_mask | If a bit is 0, a corresponding byte of the value field is "don't care" |
|  | 15 | dbyte_sel_{0, 1, 2} | Select up to three 16-bit fields as range |
|  | 48 | dbyte_up_bound_{0, 1, 2} | specification |
|  | 2 | dbyte_range_concat | If bit i is set, combine field i and i + 1 for 32-bit comparison |

As shown in the SRAM entry table, an explicit priority is provided for each entry. As noted above, priority is implicit within TCAM based on the location of the entry. In the hybrid SRAM and TCAM scheme, each TCAM entry also the 5-bit pattern are: $(53/3^0)\%3=2$ (or X for the $0^{th}$ bit in the 5-bit pattern), $(53/3^1)\%3=2$ (or X for the $1^{st}$ bit in the 5-bit pattern), $(53/3^2)\%3=2$ (or X for the $2^{nd}$ bit in the 5-bit pattern), $(53/3^3)\%3=1$ (or 1 for the $3^{rd}$ bit in the 5-bit pattern), and (53/3⁴)%3=0 (or 0 for the 4$^{th}$ bit in the 5-bit pattern). These calculations use integer division.

Referring back to Table 2, it should be noted that for a 16-bit or 32-bit range specification, if a value contains an X (e.g., "don't care" or wildcard), then the corresponding dbyte_up_bound field is not valid. Similarly, if a dbyte_up_bound is less than the corresponding value, then the dbyte_up_bound field is not valid.

Entries are each inserted as a pattern into the SRAM pools and the TCAM pool. In some embodiments, the entries are software configured into the pools. Referring back to Table 1, each SRAM way (SRAM tile or pair, depending on entry width) is associated with a key_map, which indicates whether that SRAM way is hashable for an entry to be inserted. The key_map masks bits of the entry that participate in the hash function. If a SRAM way is hashable, then the entry is inserted into that SRAM way where any x-bit of the pattern is masked off from hashing. For example, a 128-bit entry of {128.*.*.*, 162.192.*.*, 16'd456, 16'd31002, 8'h6, 24'h0} is to be inserted.

Assume the key_map of a SRAM is 32'hC0C0-00FF. Based on this assumption, this SRAM way is hashable for the 128-bit entry. In particular, every bit in the key_map masks corresponding four bits from the entry (key). The value C in hexadecimal is 1100 in binary and the value 0 in hexadecimal is 0000 in binary. This means the upper eight bits in the pattern participate in hashing, the next 24 bits do not participate in hashing, the next 8 bits participate in hashing, the next 56 bits do not participate in hashing, and the last 32 bits participate in hashing. In this case, since all the bits in the entry that participate in hashing are exact numbers, this SRAM way is hashable.

However, assume the key_map of a SRAM way is 32'hF0C0_00FF. Based on this assumption, this SRAM way is not hashable for the 128-bit entry. The value F in hexadecimal is 1111 in binary. This means the upper 16 bits in the pattern participate in hashing, the next 16 bits do not participate in hashing, the next 8 bits participate in hashing, the next 56 bits do not participate in hashing, and the last 32 bits participate in hashing. In this case, since all upper 16 bits need to participate in hashing but only the first 8 bits of the 16 bits are exact numbers and the remaining eight bits are wildcards, this SRAM way is not hashable.

If no SRAM ways are hashable, then the entry is either inserted into the spillover TCAM or, alternatively, each bit of x can be expanded into a plurality of patterns such that they are hashable. Continuing with the last assumption, since eight bits are missing for hashing, the pattern can be expanded into 2⁸ or 256 different patterns, each corresponding to 256 individual numbers. As such, all these different patterns become hashable.

Figure 6:
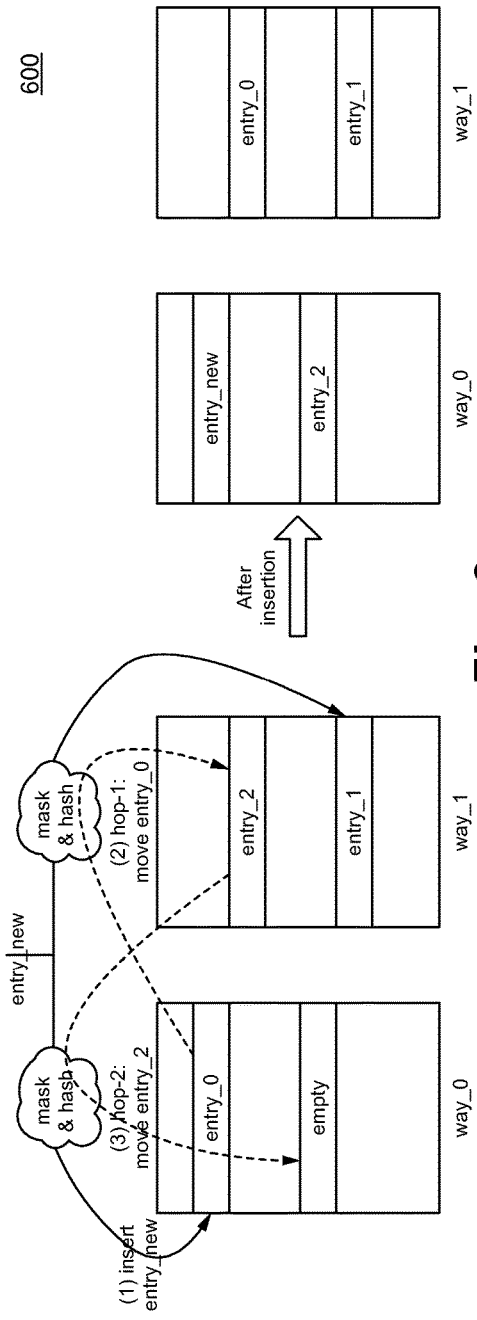
FIG. 6 illustrates an exemplary scenario of rehashing to resolve a hash conflict in accordance with some embodiments.

FIG. 6 illustrates an exemplary scenario 600 of rehashing to resolve a hash conflict in accordance with some embodiments. In some embodiments, rehashing is carried out using ways and hops. The scenario 600 depicts a 2-way hash. Once a new entry or a pattern comes in, the entry is masked and hashed for each way. Each mask and hash unit points to a location in its corresponding SRAM tile, as illustrated by the black dotted lines in FIG. 6. If one or both locations are empty, then the pattern is inserted in one of the locations. In some embodiments, if both locations are empty, then preference of insertion is given to the lower way (e.g., way_0), which is typically associated with the lowered number SRAM tile.

A hash conflict occurs when one or both locations are occupied, such as in scenario 600. In FIG. 6, the locations pointed by the mask and hash units are occupied by "entry 0" and "entry 1." In a hash conflict, entries are "kicked out" of their locations to different locations until a location is empty. In some embodiments, when both locations are occupied, the new entry is always inserted via the lower way (e.g., way_0) or arbitrarily inserted via one of the ways. In FIG. 6, the new entry is inserted via way_0 at the location of "entry 0." Assuming both ways are hashable for "entry 0," "entry 0" is rehashed via the other way (e.g., way_1). "Entry 0" is inserted in a location that is occupied by "entry 2." The insertion of "entry 0" in its new location is referred to as hop-1. Further assuming both ways are hashable for "entry 2," "entry 2" is rehashed via the other way (e.g., way_0). "Entry 2" is inserted in a location that is unoccupied. The insertion of "entry 2" in its new location is referred to hop-2. In this scenario, the hash conflict is resolved using two hops. However, in other scenarios, a hash conflict is resolved using more than two hops.

The rehash can implement a depth-first insertion algorithm (depth of all tiles), such as illustrated in FIG. 6. Alternatively, the rehash can implement a breadth-first insertion algorithm (width of each tile). Alternatively, the rehash can be based on D-left hashing. If a hash conflict cannot be resolved through rehashing, then the corresponding entry is inserted into one of the at least one spillover TCAM pools.

Figure 7:
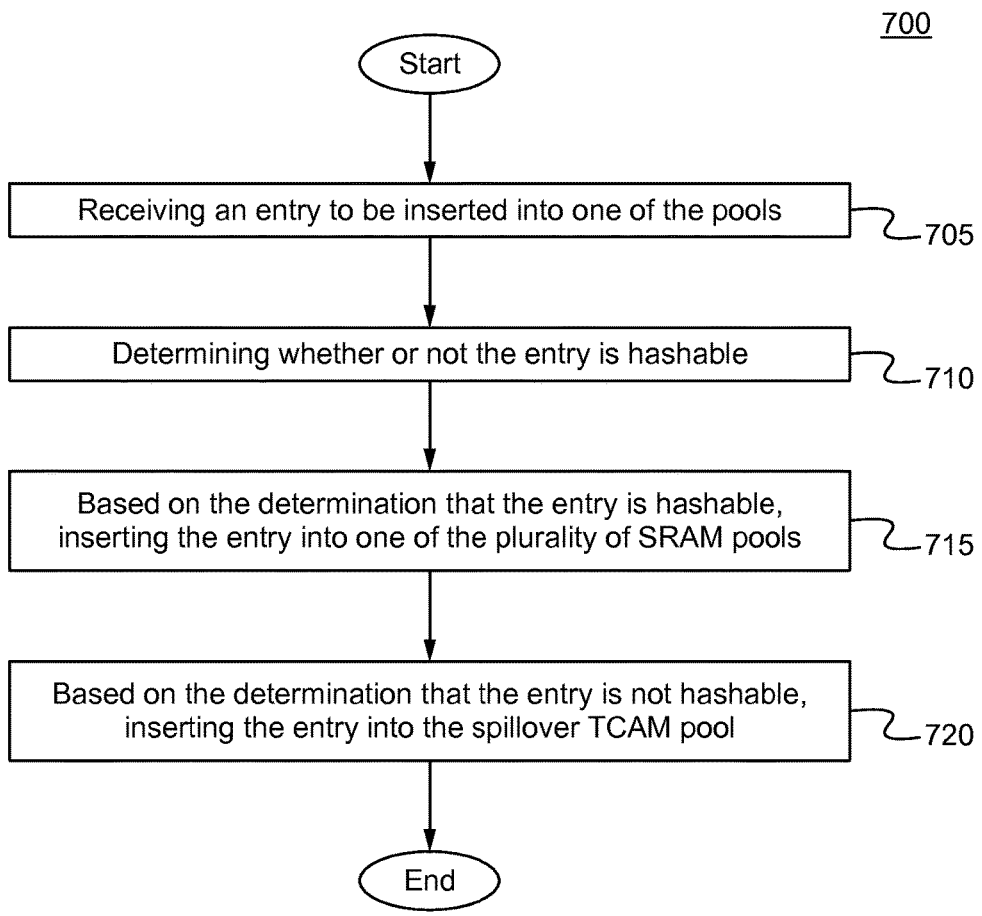
FIG. 7 illustrates a method of entry insertion in accordance with some embodiments.

FIG. 7 illustrates a method of entry insertion 700 in accordance with some embodiments. The method of entry insertion 700 is typically implemented on a network switch that includes a plurality of SRAM pools and at least one spillover TCAM pool. At a step 705, an entry to be inserted into one of the pools is received. At a step 710, it is determined whether the entry is hashable. In some embodiments, the determination at the step 710 includes comparing each key_map with the entry. As discussed above, each of the plurality of SRAM pools includes 16 SRAM tiles. Each of the 16 SRAM tiles is associated with a key_map. Each key_map masks bits of the entry that participate in hashing. The entry is hashable when all bits in the entry that participate in hashing are exact numbers. At a step 715, based on the determination that the entry is hashable, the entry is inserted into one of the plurality of SRAM pools. In some embodiments, the entry is inserted into one of two SRAM tiles of the one of the plurality of SRAM pools. In some embodiments, inserting the entry into one of the plurality of SRAM pools includes rehashing to resolve a hash conflict. The rehashing can implement a depth-first insertion algorithm or a width-first insertion algorithm. At a step 720, based on the determination that the entry is not hashable, the entry is inserted into the spillover TCAM pool. The entry is inserted as a pattern into one of the pools.

Figure 8:
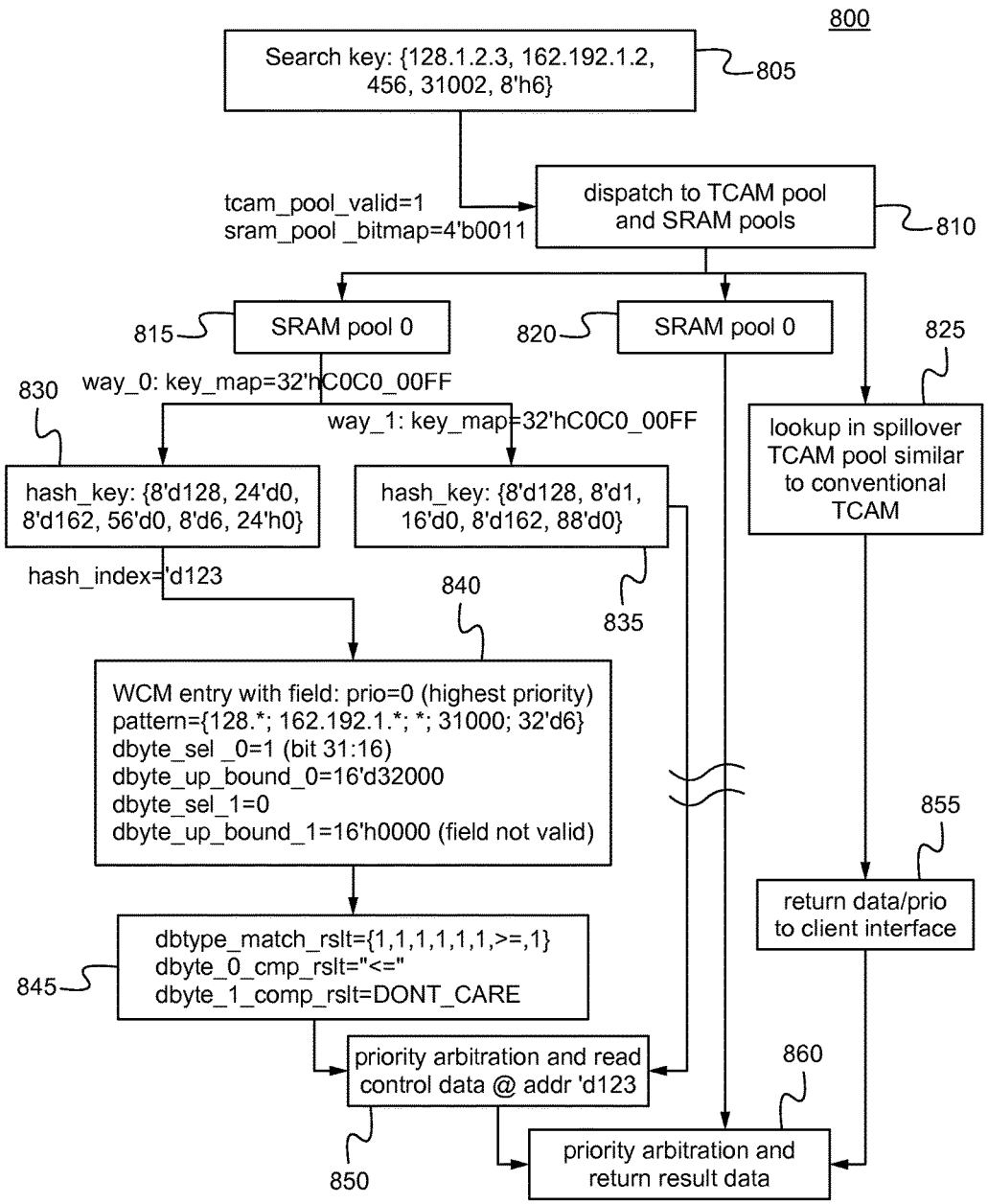
FIG. 8 illustrates an exemplary flow of table lookup in accordance with some embodiments.

Now assume that after the 128-bit entry of {128.*.*.*, 162.192.*.*, 16'd456, 16'd31002, 8'h6, 24'h0} has been inserted into SRAM pool 0, FIG. 8 illustrates an exemplary flow of table lookup 800 in accordance with some embodiments. At a step 805, a search key of {128.1.2.3, 1.62.192.1.2, 456, 31002, 8'h6} arrives at the request interface control logic 305 of FIG. 3.

At a step 810, the request interface control logic 305, based on the configurations in the hybrid WCM table, dispatches accordingly the search key to active pools. In this example, tcam_pool_valid is set to 1 and the sram_pool_bitmap is 4'b0011, which corresponds to SRAM pool 0 and SRAM pool 1. As such, the spillover TCAM pool, SRAM pool 0 and SRAM pool 1 are active pools.

At a step 815, the search key is received at SRAM pool 0. At a step 820, the search key is received at SRAM pool 1. At a step 825, the search key is received at the spillover TCAM. The steps 815-825 occur substantially simultaneously. Generally, the lookup steps in FIG. 9 occur simultaneously or in parallel.

At the step 825, lookup in the spillover TCAM is similar to conventional TCAM. At a step 855, the spillover TCAM returns the control data and priority to the request interface control logic 305.

SRAM pool 0 corresponds to a 2-way hash. Each of the ways is associated with a key_map, which is applied to mask off the corresponding bits of the search (input) key. In FIG. 8, way_0 has the key_map 32'hC0C0_00FF and way_1 has the key_map 32'hF0C0_00FF. The key_map of way_0 and the search key are applied to a hash function, which returns a hash_key of {8'd128, 24'd0, 8'd162, 56'd0, 8'd6, 24'h0} at a step 830. Similarly, the key_map of way_1 and the search key are applied to the hash function, which returns a hash_key of {8'd128, 8'd1, 16'd0, 8'd162, 88'd0} at a step 835.

The hash_key at the step 830 corresponds to the hash_index 'd123, which points to a particular entry in the SRAM tiles of SRAM pool 0 at a step 840. The entry is compared with the search key and the result is returned at a step 845.

The results from the SRAM pools 0 and 1 are returned at a step 850, in which priority arbitration is performed and control data is thereafter read from the corresponding entry that has the highest priority and that is located in the remaining SRAM tiles. In this example, nothing is returned by SRAM pool 0, way 1 and the control data is read at address 'd123 since the corresponding entry has the highest priority.

The results from the step 850 and the step 855 are returned at a step 860, in which priority arbitration is performed and the results data is returned. In this example, no data is returned by SRAM pool 1.

Figure 9:
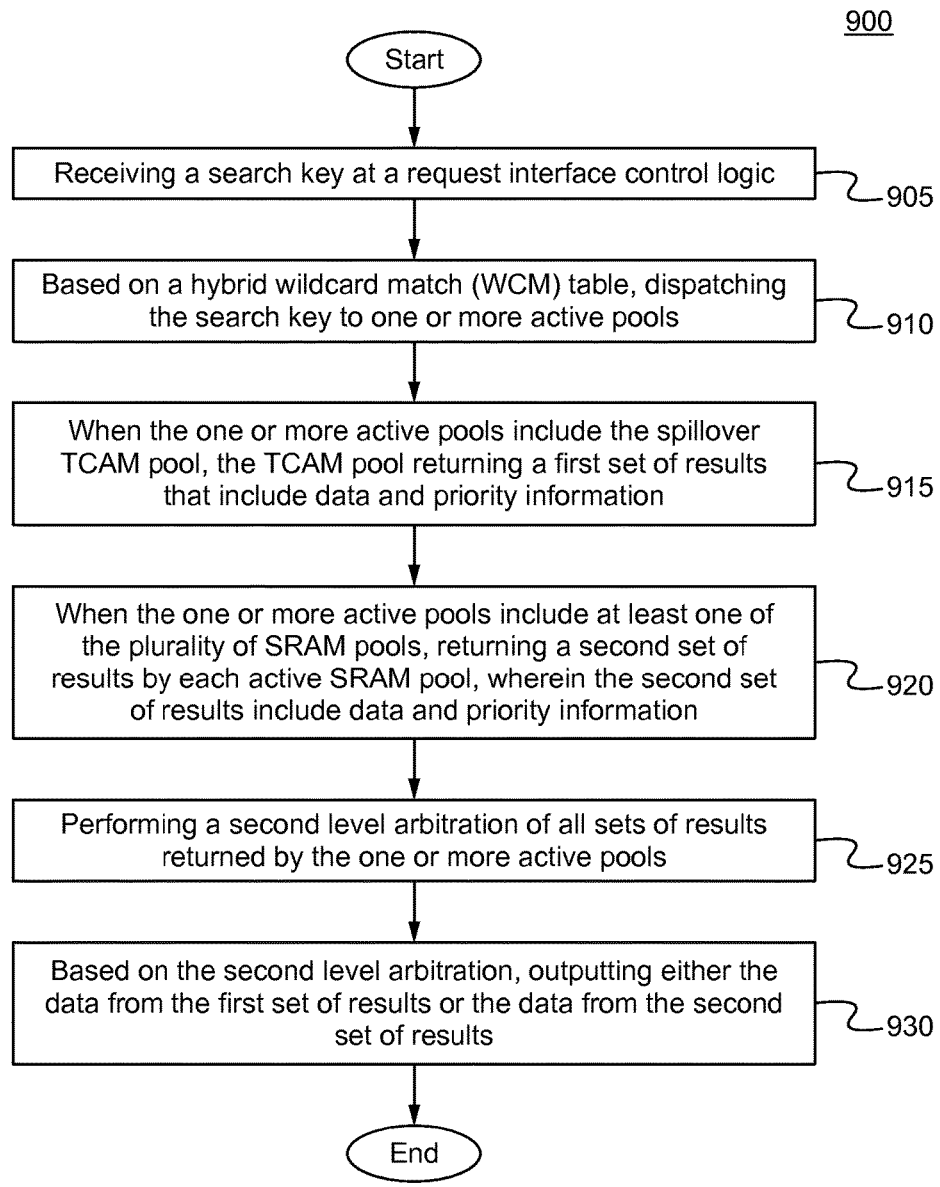
FIG. 9 illustrates a method of table lookup in accordance with some embodiments.

FIG. 9 illustrates a method of table lookup 900 in accordance with some embodiments. The method of table lookup 900 is typically implemented on a network switch that includes a plurality of SRAM pools and at least one spillover TCAM pool. At a step 905, a search key is received at a request interface control logic. The network switch typically includes the request interface control logic. At a step 910, based on a hybrid wildcard match (WCM) table, the search key is dispatched to one or more active pools. Configurations of the hybrid WCM table indicate which of the pools are the one or more active pools. In some embodiments, lookups in the one or more active pools are performed simultaneously. At a step 915, when the one or more active pools include the spillover TCAM pool, the TCAM pool returns a first set of results that includes data and priority information. At a step 920, when the one or more active pools include at least one of the plurality of SRAM pools, each active SRAM pool returns a second set of results that includes data and priority information. For each active SRAM pool, to determine the second set of results, a first level arbitration based on priority is performed for all sets of results returned by each SRAM tile of a corresponding active SRAM pool. At a step 925, a second level arbitration based on priority is performed for all sets of results returned by the one or more active pools. At a step 930, based on the second level arbitration, data from the set with the highest priority is outputted.

One of the key ideas of the wildcard matching solution is that most entries are inserted into the plurality of SRAM pools. The SRAM pools may not perform matching on tough patterns, in which case the spillover TCAM pool will perform the matching on these tough patterns. Depending on whether there is a high level software algorithm support, the hardware can be decoupled from the software algorithm. If the software algorithm is confident in performing the matching, very little TCAM resources are used. On the other hand, if the software algorithm is not confident or is lazy in performing the matching, more TCAM resources can be used.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A network switch comprising:
 a plurality of static random access memory (SRAM) pools storing hashable entries, wherein the SRAM pools are each associated with one or more hashing methods;
 at least one spillover ternary content addressable memory (TCAM) pool storing unhashable entries that spillover from the SRAM pools, wherein the unhashable entries are entries that are unable to be hashed into the SRAM pools according to the hashing methods; and
 a request interface control logic dispatching a search key for a packet to one or more active pools of the SRAM pools and the at least one TCAM pool and returning results data, wherein when one or more of the SRAM pools are active for the search key, SRAM tiles of each of the one or more of the SRAM pools return tile results, and for each of the one or more of the SRAM pools, a first level arbitration is performed between the tile results of the SRAM tile of that SRAM pool based on a priority of the tile results, and further wherein the network switch performs an action on the packet based on the returned results data.

2. The network switch of claim 1, wherein each of the plurality of SRAM pools includes 16 SRAM tiles for parallel hashing, and wherein the at least one spillover TCAM pool includes a plurality of TCAM databases as a basic matching unit.

3. The network switch of claim 1, further comprising a hybrid wildcard match (WCM) table that is accessible by the plurality of SRAM pools, the at least one spillover TCAM pool, and the request interface control logic.

4. The network switch of claim 3, wherein the hybrid WCM includes configurations for the plurality of SRAM pools, the at least one spillover TCAM pool, and the request interface control logic.

5. The network switch of claim 4, wherein the configurations includes configurations for each of the plurality of the SRAM pools, configurations for each of the at least one spillover TCAM and configurations for the request interface control logic.

6. The network switch of claim 4, wherein the configurations identify which of the plurality of SRAM pools and the at least one spillover TCAM pool are the one or more active pools.

7. The network switch of claim 1, wherein a second level arbitration takes place to determine which of the one or more active pools has priority to return the results data.

8. The network switch of claim 1, wherein the at least one spillover TCAM pool is organized into eight databases, wherein each of the eight databases includes six TCAM tiles and is accompanied with a dedicated SRAM for control data return.

9. The network switch of claim 8, wherein each of the six TCAM tiles is 64-bits wide and 512-entries deep.

10. The network switch of claim 1, wherein each of the plurality of SRAM pools includes eight pairs of SRAM tiles, wherein two of the eight pairs of SRAM tiles store control data and six of the eight pairs of SRAM tiles store entries.

11. The network switch of claim 10, wherein each of the 16 SRAM tiles is 256-bits wide and 2048-lines deep.

12. A method of implementing a network switch that includes a plurality of static random access memory (SRAM) pools, at least one spillover ternary content addressable memory (TCAM) pool and a request interface control logic dispatching a search key for a packet to one or more active pools of the SRAM pools and the at least one TCAM pool and returning results data, comprising:
   receiving an entry to be inserted into one of a group consisting of the TCAM pool and the SRAM pools;
   determining whether or not the entry is hashable;
   based on the determination that the entry is hashable, inserting the entry into one of the plurality of SRAM pools; and
   based on the determination that the entry is not hashable, inserting the entry into the spillover TCAM pool;
   wherein when one or more of the SRAM pools are active for a search key of a packet, SRAM tiles of each of the one or more of the SRAM pools return tile results, and for each of the one or more of the SRAM pools, a first level arbitration is performed between the tile results of the SRAM tile of that SRAM pool based on a priority of the tile results, and further wherein the network switch performs an action on the packet based on the returned results data.

13. The method of claim 12, wherein determining whether or not the entry is hashable includes comparing each key_map with the entry.

14. The method of claim 13, wherein each of the plurality of SRAM pools includes 16 SRAM tiles, and wherein each of the 16 SRAM tiles is associated with a key_map.

15. The method of claim 13, wherein each key_map masks bits of the entry that participate in hashing.

16. The method of claim 15, wherein the entry is hashable when all bits in the entry that participate in hashing are not wildcards.

17. The method of claim 12, wherein the entry is inserted into one of two SRAM tiles of the one of the plurality of SRAM pools.

18. The method of claim 12, wherein inserting the entry into one of the plurality of SRAM pools includes rehashing to resolve a hash conflict.

19. The method of claim 12, wherein rehashing implements a depth-first insertion algorithm.

20. The method of claim 12, wherein rehashing implements a breadth-first insertion algorithm.

21. The method of claim 12, wherein the entry is inserted as a pattern into one of the pools.

22. A method of implementing a network switch that includes a plurality of static random access memory (SRAM) pools and at least one spillover ternary content addressable memory (TCAM) pool, comprising:
   receiving a search key for a packet at a request interface control logic;
   based on a hybrid wildcard match (WCM) table, dispatching the search key to one or more active pools;
   when the one or more active pools include the spillover TCAM pool, the TCAM pool returning a first set of results that includes data and priority information;
   when the one or more active pools include at least one of the plurality of SRAM pools:
      for each active SRAM pool of the plurality of SRAM pools, performing a first level arbitration between all sets of results returned by each SRAM tile of a corresponding active SRAM pool based on priority to determine the second set of results for the corresponding active SRAM pool; and
      returning the second set of results by each active SRAM pool of the plurality of SRAM pools, wherein the second set of results includes data and priority information;
   performing a second level arbitration of all sets of results returned by the one or more active pools based on priority;
   based on the second level arbitration, outputting a selected set of all the sets of results, the selected set having highest priority of all the sets of results; and
   performing an action on the packet based on the data of the selected set.

23. The method of claim 22, wherein configurations of the hybrid WCM table indicate which of the pools are the one or more active pools.

24. The method of claim 22, wherein lookups in the one or more active pools are performed simultaneously.

25. The method of claim 22, wherein the at least one spillover TCAM pool is organized into eight databases, wherein each of the eight databases includes six TCAM tiles and is accompanied with a dedicated SRAM for control data return.

26. The method of claim 22, wherein each of the plurality of SRAM pools includes eight pairs of SRAM tiles, wherein two of the eight pairs of SRAM tiles store control data and six of the eight pairs of SRAM tiles store entries.

27. A memory structure for use with a network switch, the memory structure comprising:
   a plurality of static random access memory (SRAM) pools storing hashable entries, wherein the SRAM pools are each associated with one or more hashing methods; and
   at least one spillover ternary content addressable memory (TCAM) pool storing unhashable entries that spillover from the SRAM pools, wherein the unhashable entries are entries that are unable to be hashed into the SRAM pools according to the hashing methods,
   wherein the memory structure interfaces with a request interface control logic configured to receive a search key of a packet arriving at the network switch and to output results data, and further wherein each of the plurality of SRAM pools is configured to perform initial arbitration of all sets of results returned by each SRAM tile of a corresponding SRAM pool and to return a first data based on the initial arbitration and priority information for the first data, and further wherein the network switch performs an action on the packet based on the output results data.

28. The memory structure of claim 27, wherein the request interface control logic dispatches the search key to one or more active pools based on configurations of a hybrid wildcard match (WCM) table accessible by the request interface control logic, wherein the configurations identify which of the plurality of the SRAM pools and the at least one spillover TCAM pool are the one or more active pools.

29. The memory structure of claim 28, wherein final arbitration takes place to determine which of the one or more active pools has priority to return the results data.

30. The memory structure of claim 27, wherein each of the plurality of SRAM pools includes multiple SRAM tiles that are logically organized to represent a different logic table width.

31. The memory structure of claim 30, wherein the multiple SRAM tiles includes 16 SRAM tiles that are organized in pairs, wherein two of the eight pairs of SRAM tiles store control data and six of the eight pairs of SRAM tiles store entries.

32. The memory structure of claim 30, wherein each of the SRAM tiles is associated with a key_map.

33. The memory structure of claim 32, wherein an entry is hashable when all bits in the entry that participate in hashing are not wildcards, wherein the key_map determines which bits in the entry participate in the hashing.

34. The memory structure of claim 27, wherein the at least one spillover TCAM pool is organized into a plurality of databases, wherein each of the plurality of databases includes multiple TCAM tiles and is accompanied with a dedicated SRAM, and wherein the at least one spillover TCAM pool is configured to return a second data and priority information for the second data.

35. The memory structure of claim 34, wherein the plurality of databases includes eight databases, and wherein the plurality of TCAM tiles includes six TCAM tiles.

36. The memory structure of claim 34, wherein the multiple TCAM tiles are logically organized to correspond with a different key size.

37. The memory structure of claim 27, wherein the search key is a combination of one or more header fields of the packet.

38. The memory structure of claim 27, wherein the at least one spillover TCAM also stores entries that cannot be inserted into the plurality of SRAM pools due to hash conflicts.

39. A network switch to classify one or more entries, the network switch comprising:

a processing unit to determine a entry of the one or more entries is a hashable entry or an unhashable entry;

at least one static random access memory (SRAM) pool to store one or more determined hashable entries, the at least one SRAM pool associated with one or more hashing methods;

at least one spillover ternary content addressable memory (TCAM) pool to store one or more determined unhashable entries; and a request interface control logic dispatching a search key for a packet to one or more active pools of the SRAM pools and the at least one TCAM pool and returning results data, wherein when one or more of the SRAM pools are active for the search key, SRAM tiles of each of the one or more of the SRAM pools return tile results, and for each of the one or more of the SRAM pools, a first level arbitration is performed between the tile results of the SRAM tile of that SRAM pool based on a priority of the tile results, and further wherein the network switch performs an action on the packet based on the returned results data;

wherein the processing unit makes the determination based upon the one or more hashing methods associated with the at least one SRAM pool, wherein the one or more determined unhashable entries in the at least one spillover TCAM pool are a spillover from the at least one SRAM pool.

40. The network switch of claim 1, further comprising a set of associated entries, wherein a first portion of the entries comprise the hashable entries and a second portion of the entries comprise the unhashable entries.

* * * * *